United States Patent [19]

Lewis et al.

[11] Patent Number: 4,626,419

[45] Date of Patent: * Dec. 2, 1986

[54] CONTROL OF SO$_x$ EMISSION

[75] Inventors: Paul H. Lewis, Groves; Eugene P. Dai, Port Arthur; Edward H. Holst, Nederland, all of Tex.

[73] Assignee: Texaco Inc., White Plains, N.Y.

[*] Notice: The portion of the term of this patent subsequent to Aug. 19, 2003 has been disclaimed.

[21] Appl. No.: 750,213

[22] Filed: Jul. 1, 1985

[51] Int. Cl.$^4$ .......................... B01J 8/00; C01B 17/00; C10G 11/00; C10G 11/02
[52] U.S. Cl. ................................. 423/244; 208/113; 208/120; 423/563
[58] Field of Search .......... 423/242 A, 242 R, 244 A, 423/244 R, 563; 208/113, 120

[56] References Cited

U.S. PATENT DOCUMENTS

| | | | |
|---|---|---|---|
| 2,992,884 | 7/1961 | Bienstock et al. | 423/244 |
| 3,411,865 | 11/1968 | Pijpers et al. | 423/244 |
| 3,428,575 | 2/1969 | Pijpers et al. | 423/244 |
| 4,344,926 | 8/1982 | Petty et al. | 423/244 |
| 4,346,063 | 8/1982 | Cahn et al. | 423/244 |
| 4,423,019 | 12/1983 | Bertolacini et al. | 423/244 |
| 4,446,010 | 5/1984 | Petty et al. | 423/244 |

*Primary Examiner*—Gregory A. Heller
*Attorney, Agent, or Firm*—Robert A. Kulason; James J. O'Loughlin; Carl G. Seutter

[57] ABSTRACT

Sulfur oxides are removed from gases by contact with a composition containing potassium and cerium on alumina, the cerium being present in the form of crystals of oxide of crystal size below about 90 Angstrom Units.

23 Claims, No Drawings

4,626,419

CONTROL OF SO$_x$ EMISSION

FIELD OF THE INVENTION

This invention relates to a process for removing a gaseous sulfur compound from a mixture of gases containing sulfur oxides. More particularly, it relates to fluid catalytic cracking under conditions whereby the sulfur oxide content of the regenerator off-gas is lowered.

BACKGROUND OF THE INVENTION

As is well known, to those skilled in the art, when sulfur-containing charge hydrocarbons are admitted to a fluid catalytic cracking (FCC) reactor, the charge is converted to lower boiling products including those falling within the motor fuel boiling range. A portion of the sulfur in the charge hydrocarbon is liberated in the reactor as hydrogen sulfide and mercaptans which may be separated from the FCCU cracked products. A portion of the sulfur is fixed on the coke-containing spent catalyst which is passed from the reaction zone to the regeneration zone wherein an oxygen-containing gas is provided to regenerate the spent catalyst. The gas so formed also includes oxides of sulfur (principally sulfur dioxide plus some sulfur trioxide); and these oxides of sulfur may be the predominant undesirable species in the regenerator off-gas.

Economic considerations prevent the effective removal of sulfur oxides from the regenerator off gas; and environmental considerations dictate that they be decreased. Prior art attempts include operation under conditions such that the sulfur in the regeneration zone is fixed on the catalyst (thereby lowering the SO$_x$ content of the regenerator off-gas); and the sulfur is released as additional mercaptan and hydrogen sulfide in the reaction zone. Here these sulfur compositions may be readily passed to effluent separation operations which would not be the case for sulfur-containing gases recovered as regenerator waste-gas.

Illustrative of prior art endeavors in this area include those disclosed in U.S. Pat. No. 4,344,926 which issued Aug. 17, 1982 to Texaco Inc. as assignee of Randall H. Petty and Burton H. Barley (the text of which is incorporated herein by reference) and the prior art cited therein.

A related application is Ser. No. 522,078, filed Aug. 11, 1983 entitled Control of SO$_x$ Emission by Lewis, Dai, and Holst, now abandoned.

It is an object of this invention to provide a process for removing a gaseous sulfur compound from a mixture of gases containing sulfur oxides. Other objects will be apparent to those skilled in the art.

STATEMENT OF THE INVENTION

In accordance with certain of its aspects, this invention is directed to a process for removing a gaseous sulfur component from a mixture of gases containing sulfur oxides which comprises contacting said mixture of gases containing sulfur oxides at 800° F.–1500° F. (427° C.–816° C.) with a composite containing a porous refractory support bearing as a first component (i) at least one compound containing bismuth, chromium, or a rare earth metal, such as cerium, said first component being in the form of crystals of oxide of crystal size less than about 90 Angstrom units and as a second component (ii) at least one compound containing an alkali metal.

DESCRIPTION OF THE INVENTION

The mixtures of gases which may be treated by the process of this invention include gases which contain sulfur oxides; and commonly such gases are found to contain, as the principal oxide of sulfur, sulfur dioxide—with lesser quantities of sulfur trioxide.

In the preferred embodiment, this invention finds use in connection with fluid catalytic cracking (FCC) wherein a charge hydrocarbon is subjected to conditions including temperature of 800° F.–1200° F. (427° C.–649° C.), typically 960° F. (516° C.) to yield cracked product containing hydrocarbons boiling in the motor fuel boiling range. When the charge to cracking (typically a gas oil) contains sulfur, a portion of this sulfur is reduced in the reaction zone to hydrogen sulfide and mercaptans which are recovered with the cracked product from which they may readily be separated.

During reaction, the fluid catalyst particles become deactivated as they are covered with coke; and they also pick up a substantial portion of sulfur. This spent catalyst is passed to a regeneration zone wherein spent catalyst is contacted with oxygen-containing gas, typically air, at 1100° F.–1500° F. (595° C.–815° C.), typically 1350° F. (732° C.); and under these conditions, the spent catalyst is regenerated and may thereafter be returned to the reaction zone. During regeneration, the coke content of the spent catalyst is oxidized to form regenerator off-gas including carbon dioxide and carbon monoxide. Sulfur in the spent catalyst is oxidized to form sulfur dioxide and sulfur trioxide. The content of SO$_x$ (oxides of sulfur) in the regenerator off-gas, when the initial sulfur-containing charge contains 0.5 w%–2.5, say 2 w% sulfur, may be as high as 4 w%–5 w% of the sulfur content of the charge hydrocarbon to the reaction zone. The SO$_x$ content of regenerator off gas under these conditions may be 200–1000 ppm(v), say 600 ppm(v).

It is a feature of the process of this invention that the SO$_x$ content of these sulfur-containing gases may be reduced by contacting these gases at 800° F.–1500° F. (427° C.–815° C.), preferably 1000° F.–1500° F. (595° C.–815° C.), say 1350° F. (732° C.) wih a composite containing a porous refractory support bearing as a first component (i) at least one compound containing bismuth, chromium, or a rare earth metal such as cerium said first component being in the form of crystals of oxide of crystal size of less than about 90 Angstrom units and as a second component (ii) at least one compound containing an alkali metal, preferably potassium or sodium or cesium.

The porous refractory support which may be employed in practice of the process of this invention may be active or inactive or inert. Typical of such supports may be alumina (e.g. gamma alumina), silica, magnesia, silica-alumina, silica-magnesia, mordenite, zeolites, etc. When the SO$_x$-containing gases are passed from the regeneration zone to a separate conversion zone, the support may be any convenient support whether active or inactive or inert and may be of particle size comparable to that utilized in fluid bed operations (e.g. 20–200 microns) or that utilized in fixed bed operations (e.g. 0.1–1 inch).

It is, however, preferred in the case of FCC operations, that the support be of particle size suitable for use in FCC operations (20–200 microns). Although it is possible to utilize, as the support for removing gaseous sulfur compounds, the fluidized catalyst which is used in FCC operations, it is preferred that this support be a different phase; i.e. even in those instances when it is the same composition as the support for the FCC catalyst (or as the FCC catalyst), it is preferred that it be formulated separately and thereafter mixed with the FCC catalyst.

A typical FCC catalyst may include that marketed by Davison Chemical Division of W. R. Grace and Company under the trademark CBZ-1 containing a synthetic crystalline Y-type zeolite in an amorphous silica-alumina matrix. An equilibrium CBZ-1 catalyst, i.e. one that has been used in an FCCU, has the following characteristics:

TABLE

| Cracking Catalyst | |
|---|---|
| Property | Value |
| Surface Area, $m^2/g$ | 105 |
| Pore Volume cc/gm | 0.37 |
| Density, $lb/ft^3$ | |
| Aerated | 47.6 |
| Settled | 51.8 |
| Particle Size Distribution, wt. % | |
| Microns | |
| 0–20 | 0 |
| 20–40 | 0 |
| 40–80 | 22 |
| 80+ | 78 |
| Average Particle Size, (microns) | 86 |
| Alumina Content, wt. % | 37.7 |
| Sodium Content, wt. % | 0.41 |
| X-Ray Metals, wppm | |
| Cu | 10 |
| Ni | 220 |
| Fe | 3330 |
| Cr | 310 |
| V | 370 |
| Zeolite Content, wt. % | 7.9 |

Illustrative porous refractory supports which may be employed in the $SO_x$-removing compositions of this invention may include a gamma alumina, prepared by calcining for 3 hours at 900° F. (482° C.) the Catapal SB brand of high purity alpha alumina monohydrate marketed by Conoco Chemical Division of Continental Oil Company. The gamma alumina product is characterized as follows:

TABLE

| | |
|---|---|
| Alumina content*, wt. % | 75% |
| Loss on Ignition, wt. % | 25% |
| Carbon*, wt. % | 0.3% |
| $SiO_2$*, wt. % | 0.008% |
| $Fe_2O_3$*, wt. % | 0.005% |
| $Na_2O$*, wt. % | 0.004% |
| Sulfur*, wt. % | 0.01% |
| $TiO_2$*, wt. % | 0.12% |
| Crystal Structure* | alpha-alumina monohydrate |
| Crystal Structure** | gamma-alumina |
| Surface Area (BET)** | 250 $m^2/g$ |
| Pore Volume** | |
| 0–100A | 0.45 cc/gm |
| 0–10,000A | 0.50 cc/gm |
| Loose Bulk Density* | 49 $lb/ft^3$ |
| Particle Size Distribution* | 48% < 45 microns |
| | 9% > 90 microns |

*as received
**after calcination for 3 hours at 900° F. (482° C.)

In practice of the process of this invention, it is preferred that the support on which the oxide is present, be characterized by a surface area of 150, preferably 200–300, say 250, $m^2/g$. Surface area is measured by nitrogen adsorption using a "Digisorb" apparatus marketed by Micromeritics, Inc.

It is a feature of this invention that the composition contains (in addition to the porous refractory support) as a first component (i) at least one compound containing bismuth, chromium, or a rare earth metal such as cerium, said first component being in the form of crystals of oxide of crystal size less than about 90 Angstrom units, and as a second component (ii) at least one compound containing an alkali metal, preferably potassium, sodium, cesium, or rubidium. Preferred compositions contain potassium and cerium or sodium and cerium.

It is unexpectedly found that substantially improved results (measured in terms of the w% of feed sulfur found in the off-gas eg from the FCCU regenerator) may be obtained if the composition contains the first component in the form of crystals of oxide of crystal size of less than about 90 Angstrom Units. It is also unexpectedly found that composites containing crystals of size 20–85 Angstroms Units, more preferably 20–70 Angstrom Units, typically about 60–70 Angstrom Units, possess superior stability towards the steaming that occurs in the FCCU regenerator.

The crystal size of the crystals of the oxide of the first component typically cerium oxide, principally $CeO_2$, is the weight average crystal size as determined by X-ray diffraction line broadening, using molybdenum X-rays. The line width of the $CeO_2$ line at a d-spacing of 3.12A is measured at half peak intensity. The line widths are corrected for camera geometrical factors by using the Warren method described in H. P. Klug and L. E. Alexander, "X-ray Diffraction Procedures for Polycrystalline and Amorphous Materials," John Wiley, New York (1954), pages 502–503. Large crystal size LiF is incorporated in each sample in weighed amounts to serve as a calibration material. The LiF diffraction line at d-spacing 2.325A is measured. Crystal sizes are calculated from diffraction line widths using the well known Scherrer equation. Crystalline $CeO_2$ contents are calculated from the ratio of the intensity of the $CeO_2$ diffraction line at d-spacing 3.12A to that of the LiF at d-spacing 2.325A. The ratio is related to crystalline $CeO_2$ content by a proportionality constant. The proportionality constant is determined using mixtures of $CeO_2$ with alumina of known composition.

As the average crystal size so measured decreases, the line broadens; and eventually (in the 10–20 Angstrom Unit crystal size range), the line becomes more and more difficult to distinguish from the background.

It will be apparent that the measured size is a weight average. There is a crystal size distribution; and a given sample will contain crystals of crystal size above and below the stated weight average value.

The desired crystal size of the first component, e.g. $CeO_2$, can be obtained by controlling the amount of cerium deposited on a given surface area. The larger the cerium amount, the larger the $CeO_2$ crystals. For example, Catapal SB alumina has a surface area of 250 $m^2/g$. If this alumina is impregnated so as to contain 2.4 w% cerium, $CeO_2$ crystals form that are 10 Angstrom Units in size. It is further found that if the Catapal SB alumina is impregnated with 4.5–5.0 w% cerium, $CeO_2$ crystals form that are 60–70 Angstom Units in size. It is further found that if the Catapal SB alumina is impregnated with 6.0 w% Cerium, $CeO_2$ crystals form that are 123 Angstrom Units in size.

In order to prepare an agent that contains 2.5 w% cerium and yet has a larger $CeO_2$ crystal size than 10 Angstrom Units it is necessary that the alumina have a surface area materially smaller than 250 m²/g, say 150 m²/g. It is apparent to those skilled in the art that if an agent is improperly made so that local high concentrations of cerium salts form on the alumina, larger than expected $CeO_2$ crystals will form. It is necessary that the mixing of alumina and cerium and potassium additives be thorough. The drying of the agent after impregnation should be sufficiently slow that solution droplets do not form.

In another embodiment, it is found that post-treating a formed catalyst by steaming may modify $CeO_2$ crystal size. The effect of steaming is the more pronounced the higher the Cerium content of the agent. Thus, steaming at 1400° F.–1500° F., preferably 1470° F. for 12 to 48 hours, preferably 24 hours, of an agent that contains 2.4 w% Cerium causes no increase in $CeO_2$ crystal size. In contrast, similar steaming causes an increase in $CeO_2$ crystal size from 63–66 A.U. to 85 A.U. when the agent cerium content is 4.6–4.8 w%.

The compositions of this invention may commonly be prepared by immersing the support, typically gamma alumina of 20–200 micron particle size and having a surface area of 150–400, preferably 200–300, say about 250 square meters per gram (m²/g) in aqueous solutions of water-soluble compounds of the component metals. Typical water-soluble compounds may include: acetates, oxalates, or nitrates of cerium and of the alkali metals e.g. sodium potassium, or cesium. Chromium may be added as chromous nitrate $Cr(NO_3)_3.9H_2O$. Bismuth may be added to the alumina as a 7 w% solution of $Bi(NO_3)_3.5H_2O$ in water which has been acidified with sufficient nitric acid to form a clear solution. It is possible to add all the metals of the two components separately or in one operation.

The rare earth metals include elements of atomic number 57 to 71. This group which is sometimes referred to as the lanthanide series includes lanthanum, neodymium, cerium, praseodymium, samarium, dysprosium, and other elements which are present in small quantities. These metals are difficultly separable from one another and may be available commercially in a mixture containing about 50 w% cerium, 20–30 w% lanthanum, 15–20 w% neodymium, 5–6 w% praseodymium, and less than about 5 w% of the remaining rare earth elements. For purposes of the instant invention it is found that mixtures of rare earth elements may be employed including those commonly available which are naturally occurring mixtures which have not been separated into fractions. Pure cerium nitrate $Ce(NO_3)_3.6H_2O$ is readily available at reasonable cost. It is the preferred source.

In one preferred embodiment, it may be desirable to add the alumina support to a solution of alkali metal hydroxide and thereafter to add a solution of the nitrate of bismuth or cerium. The latter metals are precipitated as their hydroxides or oxides.

The mix may then be dried e.g. at 212° F.–300° F. (100° C.–140° C.) for 1–24 hours, say 15 hours and then crushed to desired size of 50–200 microns. It may then be calcined at 1300° F.–1500° F. (704° C.–816° C.), say 1400° F. (760° C.).

More than one metal from each group may be added (e.g. Na and K plus Bi and Ce; or K plus Bi and Ce); it is found, however, that satisfactory (i.e. improved) results may be achieved by use of one metal from each group—e.g. K—Ce; Na—Ce; K—Bi; Na—Bi; etc. The preferred composition contains potassium and cerium: K—Ce.

It is preferred that the first component (preferably bismuth or cerium) be present in the total amount of 0.5 w%–10 w%, preferably 1 w%–5 w% of the support, say about 5 w%. The second alkali metal component (e.g. potassium, sodium, or cesium) is preferably present in amounts of 0.4%–5 w%, more preferably 0.5 w%–3 w%, say 0.6 w% of the support. A preferred composition may contain 0.6 w%. potassium (expressed as K) plus 4.8 w% cerium (expressed as Ce) on gamma alumina prepared from the Catapal SB alumina.

There may be 7–100 w% of the first component oxide that is crystalline. It is unexpectedly found that the agents with 40–100 w%, preferably 60–80 w%, say 67 w% crystalline oxide have better stability towards steaming that occurs in an FCCU regenerator as far as $SO_x$ emission control is concerned.

The composition so prepared may in the preferred embodiment be mixed with FCC cracking catalyst and used in an FCCU wherein a sulfur-containing charge hydrocarbon is cracked. Illustrative of the charge hydrocarbon may be a straight run gas oil having API gravity of 22.0–26.4 and containing 0.5–2.5 w% sulfur.

In operation of the FCCU, the charge hydrocarbon (typically an Isthmus vacuum gas oil containing 1.44 w% sulfur) is heated to 800° F.–1200° F. (427° C.–649° C.), say 960° F. (516° C.) at atmospheric pressure, and admitted in vapor phase to the reaction zone (a reducing zone) wherein it contacts the fluidized powdered cracking catalyst composition which includes the FCC catalyst and the admixed agent porous refractory support bearing as a first component (i) at least one compound containing bismuth, chromium, or a rare earth metal such as cerium and as a second component (ii) at least one compound containing an alkali metal, preferably potassium, sodium, or cesium. The charge sulfur-containing hydrocarbon is cracked to yield vapor containing (i) lighter hydrocarbons including those boiling in the motor fuel range and (ii) hydrogen sulfide and mercaptans. This stream is removed from the reaction zone and subjected to separation operations wherein the hydrocarbons are separated from sulfur-containing components.

In the reaction zone, there is laid down on the catalyst a deposit of coke-carbon in typical amount of 3.5 w%–5.0 w%, say 4.2 w% of the total weight of the catalyst. The catalyst also accumulates solid, sulfur-containing material derived from the charge sulfur-containing hydrocarbon. Typical sulfur content of the spent catalyst may be 0.03 w%–0.04 w%, say 0.03 w%.

The spent catalyst composition bearing the sulfur-containing coke is passed to a regeneration zone (oxidation zone) wherein it is contacted with oxygen-containing gas (oxygen-enriched air or more preferably, air). As regeneration proceeds at 1100° F.–1500° F. (590° C.–815° C.) say 1350° F. (732° C.) and atmospheric pressure, carbon is burned off the catalyst to form carbon dioxide and carbon monoxide. When regeneration is carried out in the "excess oxygen mode", the amount of air used (typically 180–220, say 220 thousand lbs per hour) is sufficient to produce a regenerator off gas containing 77–83 parts, say 79 parts of inert (e.g. nitrogen) gas, 1–7 parts, say 5 parts of oxygen, less than 1 part, of carbon monoxide, and 14–18 parts, say 16 parts of carbon dioxide.

The sulfur content of the catalyst particles is also oxidized to form sulfur oxides $SO_x$ principally sulfur dioxide and sulfur trioxide.

In practice of a less preferred embodiment of this invention, the sulfur-removing composition containing porous refractory support bearing as a first component (i) at least one compound containing bismuth, chromium, or a rare earth metal such as cerium and as a second component (ii) at least one compound containing an alkali metal, preferably potassium, sodium, or cesium may be absent from the FCC catalyst composition; and it may be maintained in a separate bed to which the standard FCC regenerator off-gases are passed and wherein the sulfur is fixed in solid form on the sulfur-removing composition. When this less preferred embodiment is employed, the fluidized particles which have absorbed the sulfur at 1100° F.–1500° F. (595° C.–815° C.), say 1350° C. (732° C.) are regenerated as by passing an oxygen-containing gas over the catalyst at 850° F.–1000° F. (454° C.–538° C.), say 920° F. (493° C.) at atmospheric pressure.

In practice of the process of this invention, much of the sulfur in the regenerator becomes fixed in solid form (as sulfate, etc) on the porous refractory support bearing as a first component at least one compound containing of bismuth, chromium, or a rare earth metal such as cerium and as a second component (ii) at least one alkali metal, preferably potassium, sodium, or cesium. The total sulfur content of the fluidized cracking catalyst composition including the additive may be 0.03–0.04 w%, say 0.034 w% (as S) based on total composition.

This sulfur-bearing regenerated catalyst composition is preferably passed to the reaction zone, wherein, under the conditions of reaction, much of the sulfur thereon is released as hydrogen sulfide and mercaptans.

The overall result of this sequence of operations in a typical microactivity activity test evaluation is that:

(i) 20–35 w%, of the 2 w% of the sulfur in the charge hydrocarbon is desirably released as hydrogen sulfide and mercaptans in the reaction zone overhead;

(ii) 0.1–0.9 w%, of the 2 w% of the sulfur in the charge hydrocarbon is found in the regenerator off-gas; and (iii) 65–80 w% of the 2 w% of the sulfur in the charge is found in the liquid product.

Practice of the process of this invention will be apparent to those skilled in the art from inspection of the following examples wherein, as elsewhere in this specification, all parts are parts by weight unless otherwise stated.

DESCRIPTION OF SPECIFIC EMBODIMENTS

Example I

In this example, which represents the best mode presently known of carrying out the process of this invention, the charge alpha aluminum oxide monohydrate (100 parts) is Catapal SB alumina marketed by Conoco. The surface area is 250 m²/g. This product is pure alumina (of 50–200 micron particle size) except for the following impurities:

TABLE

| Component | W % |
|---|---|
| $TiO_2$ | 0.12 |
| $SiO_2$ | 0.008 |
| $Fe_2O_3$ | 0.005 |

TABLE-continued

| Component | W % |
|---|---|
| Carbon | 0.3 |
| Sulfur | 0.01 |
| $Na_2O$ (plus all alkali metals) | 0.004 |

This catalyst composition is evaluated for its $SO_x$ emission reduction capacity in a micro activity tester which simulates FCC conditions including the following:

TABLE

| | Condition | Value |
|---|---|---|
| Reaction Zone | Average Temperature (°F.) | 960 |
| | (°C.) | 516 |
| | Reaction Time (min) | 10 |
| | Catalyst Inventory (g) | 10 |
| | Pressure | atmospheric |
| | Nitrogen Flow rate ml/min | 175 |
| | Catalyst: oil (wt ratio) | 3.0 |
| Regeneration zone - | (Complete coke combustion mode) | |
| | Air Flow ml/min | 175 |
| | Average Temperature (°F.) | ca 1300 |
| | (°C.) | 705 |
| | Regeneration Time (min) | 15 |

The charge to the reaction zone, in vapor phase at 920° F. (473° C.), is a synthetic gas oil containing 2 w% sulfur having the following composition:

TABLE

| Component | W % |
|---|---|
| n-dodecane | 90.6 |
| Hexene-1 | 1.0 |
| Benzothiophene | 8.4 |

During evaluation, measurements are made of (i) the $SO_x$ emitted in the regenerator off-gas, these being reported as w% of the sulfur contained in the sulfur-containing hydrocarbon charge and (ii) the sulfide ($H_2S$ and mercaptans) contained in the cracked product leaving the reactor overhead—as weight % of the sulfur contained in the sulfur-containing hydrocarbon charge.

A solution is prepared so that 100 ml of it contains 17.5 g of cerium nitrate $Ce(NO_3)_3.6H_2O$. 85 ml of this solution is added to 93.4 g of dry alumina with mixing so as to form a moist mull. This is dried at temperatures ranging from ambient up to 212° F. To this product is added 85 ml of a KOH solution that contains 1.0 g of KOH per 100 ml of solution. The mix is dried at 185°–230° F. (85°–110° C.) for 15–24 hours and then calcined at 1400° F. (760° C.) for 24 hours. Analysis shows that the composition agent contains alumina, 0.6 w% potassium, and 4.8 w% cerium (corresponding to 5.9 w% cerium oxide, $CeO_2$). The crystal size of the $CeO_2$ is 66 Angstrom Units. The crystalline $CeO_2$ content is 3.9 w%. The product is then pulverized to 50–200 micron size. For laboratory microactivity testing, one part of this agent is mixed with nineteen parts by weight of Davison CBZ-1 Commercial equilibrium cracking catalyst.

Example II

The agent of Example I is steamed for 24 hours at 1470° F. prior to mixing with cracking catalyst. The agent contains $CeO_2$ crystals that are 85 A.U. in size and the agent contains 2.6 w% of crystalline $CeO_2$. For laboratory testing for activity, one part of this agent is mixed with nineteen parts by weight of Davison CBZ-1 equilibrium cracking catalyst.

Example III

The product of Example III is prepared by making a solution such that 100 ml of it contains 16.8 g of cerium nitrate $Ce(NO_3)_3.6H_2O$. 85 ml of this solution is added to 93.1 g of dry alumina with mixing to form a moist mull. This is dried at temperatures ranging from ambient up to 212° F. To this product is added 85 ml of a KOH solution that contains 1.7 g of KOH per 100 ml of solution. The mix is dried at 185°-230° F. (85°-110° C.) for 15-24 hours and then calcined at 1100° F. for 2 hours. Analysis shows that the composition contains alumina, 1.0 w% potassium, and 4.6 w% cerium (corresponding to 5.6 w% $CeO_2$). The crystal size of the $CeO_2$ is 63 A.U. The crystalline $CeO_2$ content is 4.1 w%. The product is then pulverized to 50-200 micron size. For laboratory microactivity testing one part of this agent is mixed with nineteen parts by weight of Davison CBZ-1 commercial equilibrium cracking catalyst.

Example IV

The agent of Example III is steamed for 24 hours at 1470° F. prior to mixing one part with nineteen parts Davison CBZ-1 equilibrium cracking catalyst. The crystal size of the $CeO_2$ formed was 85 A.U. The crystalline $CeO_2$ content of the agent is 3.7 w%.

Example V

The agent of Example V is prepared by using Catapal SB alumina. A solution is prepared so that 100 ml of it contains 11.3 g of cerium nitrate $Ce(NO_3)_3.6H_2O$. 85 ml of this solution is added to 92.6 g of dry alumina with mixing so as to form a moist mull. This is dried at temperatures ranging from ambient up to 212° F. To this product is added 85 ml of a KOH solution that contains 5.0 g of KOH per 100 ml. of solution. This mix is dried at 185°-230° F. (85°-110° C.) for 15-24 hours and then calcined at 1400° F. for 24 hours. Analysis shows that the composition contains alumina, 3.0 w% potassium and 3.1 w% cerium (corresponding to 3.8 w% cerium oxide, $CeO_2$). The crystal size of the $CeO_2$ is 94 A.U. The crystalline $CeO_2$ content is 3.9 w%. This material is evaluated in a microactivity evaluation unit by adding one part of the agent to 9 parts of equilibrium Davison Cracking catalyst CBZ-1. The catalyst is also evaluated in a pilot-unit size unit by mixing one part of the agent with 32 parts of the equalibrium cracking catalyst inventory.

Example VI

The agent of Example VI is prepared by making a solution such that 100 ml of it contains 21.9 g of cerium nitrate $(Ce(NO_3)_3.6H_2O)$. 85 ml of this solution is added to 91.4 g of dry alumina with mixing so as to form a moist mull. This is dried to temperatures ranging from ambient up to 212° F. To this is added 85 ml of a KOH solution that contains 1.7 g KOH per 100 ml of solution. The mix is dried at 185°-230° F. (85°-110° C.) for 15-24 hours and then calcined at 1400° F. (760° F.) for 24 hours. Analysis shows that the composition contains alumina, 1.0 w% potassium, and 6.0 w% cerium (corresponding to 7.4 w% cerium oxide, $CeO_2$). The crystal size of the $CeO_2$ is 123 A.U. The crystalline $CeO_2$ content is 6.5 w%. The product was then pulverized to 50-200 micron size. Ten parts of the agent were then mixed with 90 parts of equilibrium cracking catalyst CBZ-1.

EXAMPLE VII

The agent of Example VII is prepared by making a solution such that 100 ml of it contains 8.75 g of cerium nitrate $Ce(NO_3)_3.6H_2O$. 85 ml of this solution is added to 93.5 g of dry alumina with mixing so as to form a moist mull. This is dried at temperature ranging from ambient up to 212° F. To this product is added 85 ml of a KOH solution that contains 5.0 g of KOH per 100 ml of solution. The mix is then dried at 185°-230° F. (85°-110° C.) for 15-24 hours and then calcined at 1400° F. for 24 hours. Analysis shows that the composition contains alumina, 2.4 w% cerium (corresponding to 3.0 w% cerium oxide, $CeO_2$) and 3.0 w% potassium. The crystal size of the $CeO_2$ could not be accurately determined because of the great breadth of the $CeO_2$ diffraction line. The agent contains about 0.2 w% crystalline $CeO_2$. The overall crystal size is about 10 A.U. This material is evaluated by mixing one part agent with nineteen parts by weight of commercial Davison CBZ-1 equlibrium cracing catalyst.

Example VIII

The agent of Example VII is steamed at 1470° F. for 24 or 48 hours. The agent is found to contain $CeO_2$ crystals there are about 10 A.U. in size. This material is evaluated by mixing one part agent with ninteen parts by weight of commercial Davison CBZ-1 equalibrium cracking catalyst.

The catalyst so prepared are all tested in a manner comparable to that of Example I. The results are as follows:

TABLE

| Example | Total Content, w %. | | | Crystalline CeO₂ | | % Feed S as SOx |
|---|---|---|---|---|---|---|
| | Ce | CeO₂ | K | Size A.U. | Content, w % | |
| I | 4.8 | 5.9 | 0.6 | 66 | 3.9 | 0.1 (b) |
| II | 4.8 | 5.9 | 0.6 | 85 | 2.6 | 0.3 (b) |
| III | 4.6 | 5.6 | 1.0 | 63 | 4.1 | 0.2 (b) |
| IV | 4.6 | 5.6 | 1.0 | 85 | 3.7 | 0.3 (b) |
| V* | 3.1 | 3.8 | 3.0 | 94 | 3.9 | 0.4 (a) |
| VI* | 6.0 | 7.4 | 1.0 | 123 | 6.5 | 0.6 (a) |
| VII | 2.4 | 3.0 | 3.0 | "10" | 0.2 | 0.2 (b) |
| VIII | 2.4 | 3.0 | 3.0 | "10" | 0.2 | 0.5 (b) |

(a)Evaluated with 10 parts agent plus 90 parts equilibrium CBZ-1
(b)Evaluated with 5 parts agent plus 95 parts equilibrium CBZ-1
*Control sample From the above table, the following conclusions may be drawn:

(i) Examples I and III, which show the best mode presently known, show a Ce-K agent containing crystals of cerium oxide of crystal size of about 65 Angstrom Units permits operation to yield regenerator off-gas which desirably contain only 0.1-0.2 w% of the feed sulfur (as $SO_x$).

(ii) Examples II and IV show that the agents of Examples I and III withstand best the steaming that an agent would encounter in an FCCU regenerator. Regenerator off-gas contains 0.3 w% of the feed sulfur.

(iii) Example VII and VIII show a Ce-K agent containing crystals of cerium oxide of about 10 Angstrom Units permits operation to yield regenerator off-gas which desirable contain only 0.2 w% of the feed sulfur (as $SO_x$). However, the steam stability of this agent is poorer in that steaming causes the agent to permit 0.5 w% of the feed sulfur to escape in the regenerator off-gas.

(iv) Example VI, which is outside the scope of this invention (the crystal size is 123 AU) may give some improvement (0.6 w% of the feed sulfur is emitted as $SO_x$) but it gives less improvement than may be attained by the instant invention.

(v) Example VI is tested in 10 w% concentration (to yield 0.6%) whereas in Example I, the concentration is 5 w% (to yield 0.1%). Thus the degree of improvement may be equal to a factor of 12.

Example IX

The agent of Example IX is prepared by using Catapal SB alumina. A solution is prepared so that 100 ml of it contains 27.2 g of chromous nitrate $Cr(NO_3)_3.9H_2O$. 85 ml of this solution is added to 92.0 g of dry alumina with mixing so as to form a moist mull. This is dried at temperatures ranging from ambient up to 212° F. To this product is added 85 ml of a KOH solution that contains 5.0 g of KOH per 100 ml of solution. The mix is dried at 185°–230° F. (85°–110° C.) for 15–24 hours and then calcined at 1400° F. for 24 hours. Analysis showed that the composition contained alumina, 3.0 w% potassium and 3.0 w% chromium (corresponding to 4.4 w% chromic oxide, $Cr_2O_3$.

Although this invention has been illustrated by reference to specific embodiments, it will be apparent to those skilled in the art that various changes and modifications may be made which clearly fall within the scope of this invention.

What is claimed is:

1. A process for removing a gaseous sulfur component from a mixture of gases containing sulfur oxides which comprises
    contacting said mixture of gases containing sulfur oxides at 800° F.–1500° F. with a composite containing a porous refractory support bearing as a first component (i) at least the compound containing 0.5–10 w% bismuth, chromium, or a rare earth metal, said first component being in one form of crystals of oxide of crystal size less than about 90 Angstrom units and as a second component (ii) at least one compound containing 0.4–5 wt% alkali metal.

2. A process as claimed in claim 1 wherein said porous refractory support is alumina.

3. A process as claimed in claim 1 wherein said first component is bismuth.

4. A process as claimed in claim 1 wherein said first component is cerium.

5. A process as claimed in claim 1 wherein said second component is potassium.

6. A process as claimed in claim 1 wherein said second component is sodium.

7. A process as claimed in claim 1 wherein said first component is present in amount of 1–5 w% based upon said support.

8. A process as claimed in claim 1 wherein said second component present in amount of 0.5–3 w% based upon said support.

9. A process as claimed in claim 1 wherein said crystal size is about 10–90 Angstrom Units.

10. A process as claimed in claim 1 wherein said crystal size is about 40–70 Angstrom Units.

11. A process as claimed in claim 1 wherein said crystal size is about 60–70 Angstrom Units.

12. A process for removing a gaseous sulfur component from a mixture of gases containing sulfur oxides which comprises
    contacting said mixture of gases containing sulfur oxides at 800° F.–1500° F. with a composite containing an alumina support bearing 0.5 w%–10 w% of at least one compound containing cerium and 0.4 w%–5 w% of at least one compound containing potassium, said cerium being in the form of crystals of cerium oxide of crystal size of about 40–70 Angstrom Units.

13. A process which comprises
    contacting a sulfur-containing hydrocarbon charge stock in a reaction zone at 800° F.–1200° F. with a fluidized particulate cracking catalyst composition including a cracking catalyst and a porous refractory support bearing as a first component (i) at least one compound containing 0.5–10 w% bismuth or cerium, said first component being in the form of crystals of oxide of particle size less than about 90 Angstrom Units and as a second component (ii) 0.4–5 w% of at least one alkali metal thereby forming (i) reaction product containing normally liquid cracked hydrocarbon products including, as hydrogen sulfide and mercaptans, a portion of the sulfur from said sulfur-containing hydrocarbon charge stock and (ii) spent catalyst composition bearing sulfur-containing coke;
    removing from said reaction zone cracked hydrocarbon products in admixture with hydrogen sulfide and mercaptans;
    separating said cracked hydrocarbon products from the hydrogen sulfide and mercaptans in said admixture;
    passing to a regeneration zone said spent catalyst composition bearing sulfur-containing coke;
    contacting said spent catalyst composition bearing sulfur-containing coke in said regeneration zone with oxygen-containing gas at 1100° F.–1500° F. thereby forming regenerator off-gas of decreased content of oxides of sulfur and regenerated cracking catalyst containing a solid composition of sulfur and as a first component (i) at least one compound containing bismuth or cerium and as a second component (ii) at least one alkali metal; and
    passing said regenerated catalyst containing a solid composition of sulfur and as a first component (i) at least one compound bismuth or cerium and as a second component (ii) at least one alkali metal, to said reaction zone wherein sulfur on said regenerated catalyst composition is converted to hydrogen sulfide.

14. A process as claimed in claim 13 wherein said porous refractory support is alumina.

15. A process as claimed in claim 13 wherein said first component is bismuth.

16. A process as claimed in claim 13 wherein said first component is cerium.

17. A process as claimed in claim 13 wherein said second component is potassium.

18. A process as claimed in claim 13 wherein said second component is sodium.

19. A process as claimed in claim 13 wherein said first component is present in amount of 1–5 w% based upon said support.

20. A process as claimed in claim 13 wherein said second component is present in amount of 0.5–3 w% based upon said support.

21. A process as claimed in claim 13 wherein said crystal size is about 10–90 Angstrom Units.

22. A process as claimed in claim 13 wherein said crystal size is about 40–70 Angstrom Units.

23. A process as claimed in claim 13 wherein said crystal size is about 60–70 Angstrom Units.

* * * * *